TIMING PULSE GENERATOR

Filed Sept. 12, 1958 2 Sheets-Sheet 1

JACOB J. KEILSOHN
JAMES W. PEGHINY
INVENTORS
BY WILLIAM G. MILLER JR.
AGENT

TIMING PULSE GENERATOR

Filed Sept. 12, 1958 2 Sheets-Sheet 2

JACOB J. KEILSOHN
JAMES W. PEGHINY
*INVENTORS*
BY William G. Miller Jr.
WILLIAM G. MILLER JR.
*AGENT*

United States Patent Office 3,090,944
Patented May 21, 1963

3,090,944
TIMING PULSE GENERATOR
Jacob J. Keilsohn, Huntingdon Valley, and James W. Peghiny, Philadelphia, Pa., assignors to Sperry Rand Corporation, New York, N.Y., a corporation of Delaware
Filed Sept. 12, 1958, Ser. No. 760,679
16 Claims. (Cl. 340—172.5)

This invention relates to timing pulse generators of a type suitable for use in timing or synchronization of the operations of a digital computer.

In computers of this type, it is frequently desirable to have the timing of the various sections of the computer coordinated with the withdrawal of information stored in a memory device.

This memory device may be, for example, a magnetic drum on which there is recorded information to identify the position of each character which can be printed by a type wheel or cylinder rotated with the drum. Alternatively, the information may be data to be operated on in the computer by the arithmetic portion or still other types of data which must be utilized in synchronism with computer operations. In order to synchronize the operations of a portion of the computer, such as a printer, with position identifying information from the memory, there may be established a timing track on the memory drum. One form of this timing track, for example, consists of regularly spaced magnetic spots representing character positions and detectable by a magnetic head which, in turn, is connected to an amplifying circuit. The amplifying circuit is arranged to generate a timing or sprocket signal of sufficient amplitude to effect the desired operation, such as the printing operation in synchronization with the character position.

In timing pulse generators of this type, there is frequently encountered the problem of noise suppression. There may be, for instance, a background noise obtained from the timing track on the drum which may be due to a lack of homogeneity in the magnetic coating on the drum or result from spurious signals having been introduced into the timing track. Since the noise which is encountered by such a generator can be fairly large in amplitude, it is desirable to utilize circuitry which is highly discriminating as to the amplitude of input signals which will produce an output. The present invention accomplishes this high degree of discrimination in producing the required sprocket or timing signal as an output.

It is an object of this invention to provide a timing pulse generator with improved noise suppression characteristics.

Another object of this invention is the provision of new and improved means for developing a sprocket or timing pulse from the timing track of a magnetic recording medium.

Another object of this invention is the provision of a new and improved amplifier having asymmetrical gain.

Still another object of this invention is the provision of a new and improved amplifier providing both asymmetry of gain and a threshold characteristic.

Still another object of this invention is the provision of an improved noise suppressor circuit.

Another object of this invention is the provision of a pulse shaping means having an output means to suppress noise signals.

In accordance with this invention, a magnetic recording medium is used to provide a train of signals each of which is produced as a cycle of alternating positive and negative signals. Saturable core means of high remanence is provided for generating a sprocket pulse of a certain polarity for each signal cycle and for suppressing noise signals of the same polarity.

In an embodiment of the invention, a pulse forming circuit for these signals is provided. This pulse former has a transformer with a magnetic core that has a substantially rectangular hysteresis loop to provide a threshold below which noise signals are suppressed. This type of transformer in combination with a means for providing different drives of the core for different polarity signals provides both a sprocket output pulse and a high degree of noise suppression in the output.

The foregoing and other objects, the advantages, construction and operation of the present invention may be best understood from the following description and the accompanying drawings, in which like reference numerals refer to like parts, and in which.

Figure 1:
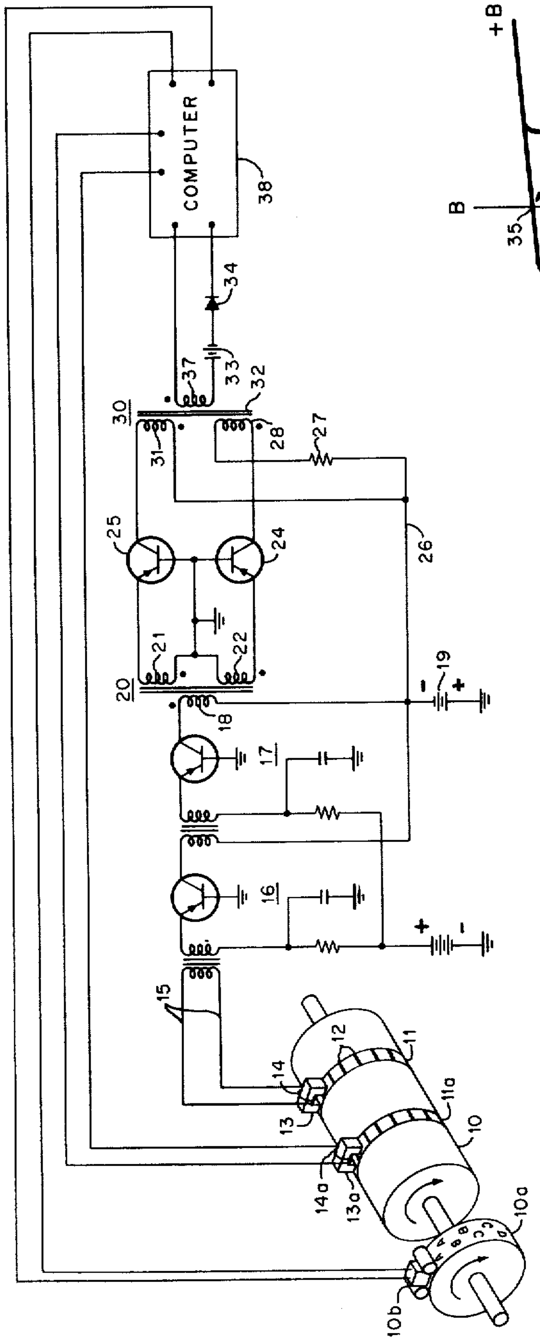
FIGURE 1 is a schematic circuit and system diagram of one form of the invention.

The timing pulse generator of FIG. 1 is shown used with a magnetic drum 10 which rotates with print wheel or cylinder 10*a* and has recorded on its magnetic surface a timing track 11 consisting of magnetized spots 12 spaced to correspond with the character positions on print wheel or cylinder 10*a*. These spots, for example, may consist of narrow magnetized areas of one polarity in a surface which is magnetized in the other polarity. Other magnetizing systems and other magnetic recorders, such as magnetic tape, may be used.

Figure 2:
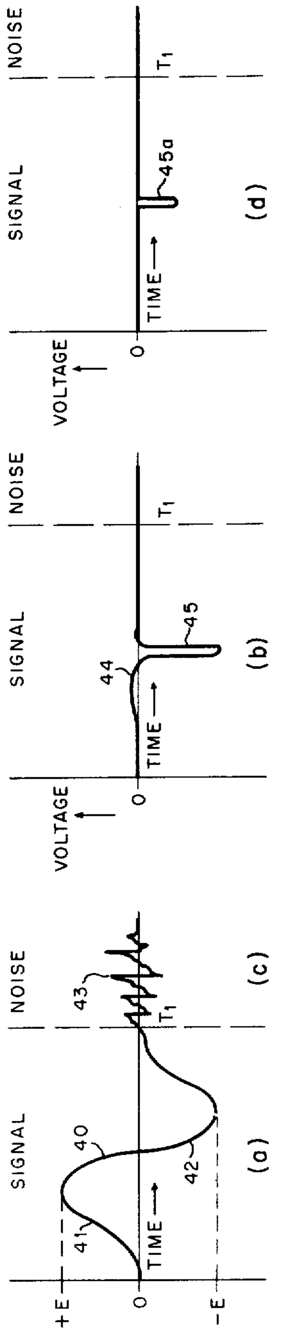
FIGURE 2 is an idealized graph of wave forms which occur at parts of the circuit of FIG. 1.

The timing track 11 has placed in juxtaposition with it the magnetic head 13. This head 13 includes a coil 14 that generates a signal on lines 15 which are transformer coupled to cascade amplifiers 16 and 17. As a magnetized area passes under the head 13, the flux through the head is first increased and then decreased to its original value. The increase induces in the winding 14 a voltage 41 (FIG. 2*a*) in one direction, and the decrease then induces a voltage 42 in the opposite direction in a manner which produces a single cycle of approximately sinusoidal shape. Between the magnetized areas 12, there may be other spurious, random magnetized areas from which there may be produced random noise signals of a smaller amplitude and of less duration. These other noise magnetized areas induce in the coil 14 noise signals 43 that generally have an average value of zero as shown in FIG. 2*c*. The sinusoidal signal induced in the winding 14 by the magnetized area 12 is amplified by the two amplifier stages 16 and 17 which are shown as transformer-coupled transistor amplifiers of the common base type. The transformer coupling ensures stability of gain. These transistors 16, 17 are of the PNP junction type, and their emitters are connected through separate transformer secondaries and resistors to the positive terminal of a battery. Separate capacitors are connected between the junctions of these resistors and transformer secondaries to ground to provide an A.C. bypass.

The collector of the amplifier 17 is connected through a transformer primary 18 to the negative terminal of a source of operating potential shown as battery 19. The amplifier 16 is similarly connected. The primary coil 18 is part of an input transformer 20 which has secondaries 21 and 22 oriented with respect to the primary 18 in the manner illustrated by the conventional "dot" symbol. The undotted terminal of the coil 21 is connected to the emitter of transistor 25, which is shown as a PNP junction type, and which has its base connected to a reference potential terminal shown by the conventional ground symbol. This ground connection is also made at the junction of the dotted and undotted terminals of the secondary coils 21 and 22, respectively. The collector of the transistor 25 is connected to primary coil 31 of output transformer 30, and the other end of that primary is connected to the negative side of battery 19.

Figure 3:
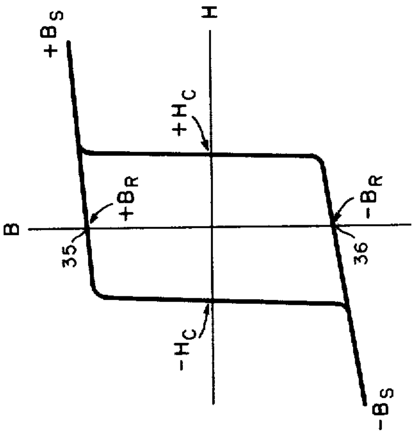
FIGURE 3 is an idealized graph of a hysteresis curve of the output transformer of FIG. 1.

The dotted terminal of the secondary winding 22 is connected to the emitter of a PNP transistor 24. This transistor 24 has a base connection similar to that of transistor 25. The collector of transistor 24 is connected to primary coil 28. In series with coil 28 is resistor 27 which is connected between the coil 28 and the battery 19. Output transformer 30 also includes a magnetic core having a substantially rectangular hysteresis characteristic (as represented in FIG. 3). The secondary coil 37 of the transformer 30 is connected in series with a D.C. potential source represented by battery 33 and a unilaterial current device represented by diode 34 and is connected to a computer 38. Also connected to the computer 38 are the coils 14*a* of other heads 13*a* which read information from the recorded information tracks 11*a*. Only one information track 11*a* and head 13*a* is shown for simplicity of illustration, whereas with the drum 10 connected to rotate with a typewheel or cylinder 10*a*, there might be, for example, six heads like 13*a* reading from six tracks like 11*a*. These heads would read a code indicative of the character on the type wheel or cylinder which is then in the printing position.

In operation, amplifiers 16 and 17 produces in primary coil 18 of transformer 20 an amplified signal having a shape similar to the waveform of FIG. 2*a* in response to the traverse of a single timing spot on the magnetic drum by the magnetic head 13. As noted above, the wave shape 40 of FIG. 2*a*, which is roughly similar to that of a sinusoidal wave, has both a positive portion 41 and a negative portion 42. However, this wave shape 40 generally has a considerable negative slope as the input goes from the maximum positive value to the maximum negative value, and the initial and ending portions of the wave 40 tend to be stretched out more than is the case for normal sinusoidal wave.

As mentioned previously, input transformer 20 has two secondary coils, namely 21 and 22, with coil 22 being so wound with respect to primary coil 18 that a positive-gaing output from amplifier 17 toward +E as shown in FIG. 2*a*, induces a positive-going voltage at the dotted terminal of coil 22. This induced voltage causes the emitter of the first transistor amplifier 24 to go positive with respect to its grounded base. On the other hand, the secondary coil 21 of transformer 20 is so wound that the negative-going portion of the input wave, as shown in FIG. 2*a*, causes the undotted end of coil 21 to be positive-going. As a result, the emitter of the second transistor amplifier 25 is positive with respect to its grounded base. This orientation of secondary coils 21 and 22 on transformer 20 then provides the proper emitter voltages for transistor 24 so that it is conducting during the positive-going portion of the input wave of FIG. 2*a* and provides a proper voltage for the emitter of transistor 25 during the negative-going portion of the same wave. The pre-amplifiers 16 and 17 produce a signal amplitude sufficient to drive the transistors into saturation.

Battery 19 provides the negative power supply for the collectors of transistors 24 and 25.

Thus, the amplifying elements, namely transistors 24 and 25, are so connected with the primary windings 28 and 31 of output transformer 30 and the source of input signals to this amplifying state, namely transformer 20, that the circuit resembles what is commonly known as a push-pull amplifier.

The signal which appears at the terminals of coil 37, as a result of the input signal of FIGURE 2*a*, is shown in FIGURE 2*b*. The generation of this signal may be explained as follows:

Initially, the core 32 of transformer 30 rests at a point 35 of positive remanence. If we assume that the magnetic head 13 is entering an area of magnetization or a magnetic spot 12, then the signal presented at primary winding 18 rises to a positive value +E as shown by numeral 41 in FIG. 2*a*. As pointed out previously, this causes transistor 24 to be forward biased as a result of the potential across secondary winding 22. Therefore, current flows in the collector circuit of transistor 24, and this current passes through primary coil 28 and resistor 27. This current is of sufficient magnitude to exceed the coercive force threshold of $-H_c$ of the core 32 of transformer 30 which causes it to traverse its magnetization curve into the negative saturation region $-B_s$. As the positive portion 41 of the sinusoidal signal 40 decreases, it leaves the core 32 at the negative remanent point —BR. FIGURE 2*b* illustrates the small positive signal 44 which is induced in the output terminal of secondary winding 37 during the positive-going portion 41 of the sinusoid. The amplitude of this portion 44 of the output voltage is kept to a small value by means of the resistor 27 in the circuit of primary winding 28. As is discussed below, the value of this resistor 27 is chosen to reduce the potential across the primary 28, but, ideally not beyond the point where the volt microseconds are sufficient to cause traversal of the hysteresis loop to $-B_s$ by the expected minimum amplitude of the positive-going portion 41 of signal 40.

The positive portion 41 of the input signal is followed by a negative portion 42 with the transition being fairly abrupt as shown by the steep negative slope of the wave of FIG. 2*a*. The presence of the negative-going portion of the input signal causes transistor 25 to be driven in the forward direction by the potential which appears across secondary winding 21. Simultaneously, the transistor 24 has its emitter effectively driven in the back direction because that emitter goes negative with respect to its base. This back voltage cuts off current flow in the collector circuit of transistor 24 and hence in the primary winding 28.

The collector circuit of transistor 25, which includes primary winding 31, places a potential of greater magnitude across winding 31 (substantially the full voltage of battery 19), when in the conductive state, than is placed across primary winding 28 when transistor 29 is in the conductive state. The lower voltage across winding 28 is the result of resistor 27 in circuit with the primary coil 28. As a result of the greater potential across winding 31, transformer core 32 traverses its relatively square hysteresis loop from the negative remanent point to the positive saturation region more quickly than the previous traversal in the opposite direction. This relatively rapid change in flux in the core of transformer 30 induces a relatively large negative-going output voltage 45 in the output winding 37. The core 32 then returns to the positive remanent point +BR. This output voltage 45 is the desired sprocket or timing pulse the leading edge of which corresponds to the leading edge of the negative signal portion 42. The voltage applied to the winding 31 is more than that needed to turn over the core, whereby the core 32 turns over very quickly to induce a narrow pulse 45 with a steep leading edge.

In order to eliminate any undesirable positive portions of the output such as 44 and to further discriminate between the desirable sprocket 45 and spurious outputs which may also be of a negative potential, battery 33 and diode 34 may be incorporated in the output circuit. Battery 33 is poled to produce an E.M.F. aiding positive signals such as 44 appearing across output winding 37. Diode 34, on the other hand, is poled so that it will be driven in the back direction by positive signals across 37 and by the bias of battery 33 thus preventing any input to the computer from the output winding 37 until it goes sufficiently negative to overcome the bias injected by battery 33 and thus produce forward conduction in the diode 34 and supply an output to computer 38. This output is shown graphically in FIG. 2*d* as sprocket 45*a* and represents another form of the desired sprocket or timing pulse 45. Those skilled in the art will understand that the waveform of FIG. 2*b* provides a sufficiently delineated pulse 45 to allow its use as a sprocket or timing pulse in a number of circuits, and the battery 33 and diode 34 are representative of one circuit for eliminating any undesirable portions of the output appearing across winding 37.

Because of the steep slope of wave 40 where it crosses the zero axis and goes negative, the switching off of transistor 24 and the switching on of transistor 25 causes the sprocket 45 to be generated in accurate time relation to that negative-going point. The amplification of stages 16 and 17 assists in flipping of core 32 and in causing the resulting leading edge of pulse 45 to correspond closely to the negative-going point. Due to this cross-over point being effectively independent of the amplitude of wave 40, the leading edge of pulse 45 will be similarly independent and will be produced at a time having a fixed relationship (due to the small inherent circuit delays) to the time wave 40 goes negative from the zero axis. This negative-going point of wave 40 is generally consistently produced at the same time with respect to the magnetic spots 12. Therefore, the leading edges of the pulses 45 are consistently related to the spots 12.

The random noise signals 43, such as shown in FIG. 2*c*, which follow the timing signal cause a slight change in the flux of the output transformer core 32 as it moves further into the positive saturation region $+B_s$, or in the other direction from its positive remanent point +BR. The effect of the positive-going portions of these noise signals is attenuated as a result of the resistor 27, so that the magnetizing currents generally do not exceed the coercive force $-H_c$ of the output transformer core 32. The core 32, therefore, does not move from its positive remanent point +BR to the steep portion of the hysteresis loop. The resulting flux changes are negligible and noise pulses are not induced in winding 37. Noise pulses of amplitudes close to that of the signal 41 may occur; but such noise pulses would be extremely narrow spikes. The frequency response of the transistors may not be sufficiently high to pass such spikes, and, even if passed, the spikes are so short in duration that they would not furnish sufficient volt-microseconds to produce a large flux change.

On the other hand, noise signals producing a drive in the +H direction drive the core 32 farther into saturation, but, due to the operation along the substantially saturated portion of the hysteresis loop, the change in flux is slight. As a result, the noise voltages induced in the secondary 37 are negligible. Thus, this substantially saturated portion of the hysteresis loop helps to prevent noise pulses that are in the same direction as the sprocket pulses 45. In addition, the average value of the noise is zero and, therefore, the positive-going noise signals would not have a cumulative adverse effect.

Thus, the noise suppression of the circuit of FIG. 1 is the result of the rectangular hysteresis loop which suppresses negative noise signals and establishes a threshold value for positive noise signals. The attenuation (due to resistor 27) of the effect of the positive noise signals together with that threshold value tends to prevent the core 32 from being driven beyond the knee of the loop.

The core of output transformer 30 effectively stays at its positive remanence point until the reading head 13 reaches another area of magnetization. When this happens, the input signal at the primary coil 18 again goes positive and causes conduction of transistor 24. The reresulting current flow in primary coil 28 causes the transformer core 32 to again go to its negative remanent point −BR. The process described previously is repeated for the remaining negative portion 42 of the sinusoidal signal 40 and another sprocket or timing signal 45 is generated. The push-pull amplifying circuit, whose operation is described above, thus serves (1) to shape the timing pulse, (2) to accurately synchronize its generation, and (3) to suppress noise signals.

It will be obvious to those skilled in the art that the push-pull circuit shown in FIG. 1 is not limited to transistors for the amplifying elements, but instead could utilize vacuum tubes. Or, if transistors are utilized, they might be of the NPN type instead of the PNP type illustrated in FIG. 1 and might be connected in a grounded-emitter or grounded-collector configuration.

Among the important features of this timing pulse generator are the following: A negative-going sprocket pulse is generated, and negative-going noise pulses are eliminated. The rectangular hysteresis loop of the transformer is utilized to eliminate the noise. The negative noise always finds the core in substantial saturation and tends to drive it further into saturation. The negative-going sprocket pulse is generated by driving the core 30 from one saturation state to the other. The positive portion 41 of the sinusoidal wave is used to reverse the core 30 to −Br from which point the core can furnish a maximum flux change for the generation of the sprocket pulse. The threshold of the core's coercivity tends to prevent the positive noise pulses from driving the core out of saturation. The attenuated drive for positive pulses assists the coercivity threshold in maintaining the core saturated for noise pulses. This attenuated drive permits full core reversal by the positive sinusoid portion 41 and does not affect adversely the generation of the sprocket pulse 45. A certain time relation between the sprocket 45 and the original magnetic timing spots 12 is maintained.

It will also be recognized by those skilled in the art that in place of resistor 27, which here appears in the collector circuit of transistor 24, a resistor or another type of impedance may be inserted in another portion of the transistor circuit. Also, instead of using a resistor to provide an attenuated drive, so that the two sides of the circuits have, in effect, different gains, the transistors may be selected so that transistor 24 has a gain less than transistor 25. Still another arrangement might include differences in the turns ratios as between the primary 18 of transformer 20 and its secondaries 21 and 22. All of these variations would accomplish the same purpose; namely, the establishment of a drive on the winding 31 that is smaller than the drive on the winding 28. However, the smaller drive on winding 31 should be sufficient to drive the core 32 to the opposite state of saturation in response to the positive input portion 41.

As mentioned previously, the sprocket or timing pulse developed at secondary 37 can be utilized as shown in FIG. 1 to synchronize the operation of printing mechanism 10*b* with the position of specific characters on the print wheel or cylinders 10*a* and the appearance of those characters in the data to be printed out of the computer 38. By comparing the code being read from tracks 11*a* by heads 13*a*, with the computer data, both of which may have six binary code positions, a correspondence or lack of correspondence with the data to be printed can be detected. The printing mechanism 10*b* can be actuated by the sprocket pulse when correspondence has been found to exist. The character associated with the code being read by heads 13*a* will thus be printed.

The magnetized spots may be placed in their proper position on the drum by suitable means, for example, by a head similar to 13 having a coil 14 energized by a D.C. circuit as the drum is manually positioned to each character location. The required time between the reading of the code and the generation of the sprocket pulse may be provided by the relative positions of heads 13 and 13*a*. This allows the comparison of the code being read out with the data to be printed prior to the time of generation of the sprocket pulse.

This invention is not limited in its application to signals that are near-sinusoidal shapes like the wave 40.

This invention may also be used for generating pulses from other waveforms having alternating positive and negative portions. For example, the operation of this circuit would be similar if the signal returned to and remained for a time at zero after the positive portion 41 and before the negative portion 42 started. The near-sinusoidal wave 40 is advantageous in providing a steep slope at the crossover which produces fast circuit operation.

This invention may also be used to shape signals other than timing track signals. For example, it may be used to shape code signals such as those read by the heads 13*a*.

Accordingly, by means of this invention, a new and improved pulse generator is provided to develop pulses such as sprocket or timing pulses capable of synchronizing a computer operation with signals from a magnetic recording device. This pulse generator circuit exhibits a high degree of noise suppression.

Having thus described our invention, we claim:

1. A noise insensitive pulse generator comprising means having a plurality of spaced magnetic portions along a surface thereof; a magnetic transducer head adjacent said means and responsive to relative motion between said magnetic portions and said head to produce an alternating signal of a single cycle for each of said magnetic portions; and pulse shaping means coupled to said head for producing pulses from said alternating signals and suppressing intervening noise signals, said pulse shaping means including an amplifying circuit connected to receive said alternating signals from said head, an output transformer having primary coil means connected to receive outputs from said amplifying circuit, secondary coil means and a core with a substantially rectangular hysteresis loop, and means operative in conjunction with the coercivity of said core for establishing a minimum value of amplified signal sufficient to produce an output signal in said secondary coil.

2. A timing pulse generator comprising a magnetic recording surface having spaced magnetized portions, a magnetic head responsive to relative motion between said magnetizied portions and said head to generate a single cycle of alternate polarity signals for each of said portions, an output circuit, an output transformer connected to said output circuit and having a core with a rectangular hysteresis loop characteristic to provide two stable states and a threshold associated with each of said states beyond which said output transformer must be driven in response to each polarity of said signals to produce an output from said output circuit, a first means coupled to said head for driving said output transformer beyond one of said thresholds in response to one polarity of said signals, and a second means coupled to said head for driving said output transformer beyond another of said thresholds in response to another polarity of said signals whereby each cycle of said alternating signals causes said output transformer to traverse its hysteresis loop and at least one of said thresholds prevents outputs in response to noise signals insufficient to drive said output transformer from its existing stable state beyond the corresponding threshold.

3. Pulse shaping means comprising input signal receiving means, a first and second amplifying means coupled to said receiving means for selectively amplifying different portions of an input signal, said first amplifying means having lower gain than said second amplifying means, and bistable output means coupled to said amplifying means and having for each stable condition a threshold value for amplified signals having the polarity required to transfer said output means to the other stable condition, the lower gain of said first amplifying means being just sufficient to overcome said threshold and cause a slow change of said output means from a first stable state to a second stable state in response to one portion of said input signal and the gain of said second amplifying means being sufficiently great to cause a rapid change of said output means from said second stable state to said first stable state in response to another portion of said input signal, said bistable output means producing an output signal of magnitude corresponding to the rate of change of said output means from one stable state to another.

4. Pulse shaping means comprising input signal receiving means, a first and second amplifying means coupled to said receiving means for selectively amplifying different portions of an input signal, said first amplifying means having lower gain than said second amplifying means, output means coupled to said first and second amplifying means and having first and second stable conditions, said output means being such that when in the first condition only signals of one polarity and above a certain threshold change the output means from that first stable condition toward the second so that said lower gain and said threshold value cooperatively produce suppression of noise signals.

5. An electronic circuit comprising a first and second transistor each having an emitter electrode, a collector electrode, and a base electrode, a transformer having a core with a substantially rectangular hysteresis characteristic, said transformer having a first and second primary coil and a secondary coil linking said core, input receiving means, means connecting said input receiving means in circuit with said emitter electrodes and base electrodes of both said first and said second transistors, and means connecting said first and second primary coils in circuit with said collector electrodes of said first and second transistors respectively to form a push-pull connection of said first and second transistors, a resistor connected in circuit with said collector electrode of said first transistor so that the gain due to said first transistor is less than the gain due to said second transistor.

6. A noise suppression circuit comprising input means connected to a source of input signals, a push-pull amplifying circuit having two sides with respectively greater and lesser gain corresponding to input signals of one and another polarity, an output transformer having a core with a substantially rectangular hysteresis loop and primary and secondary coil means, and means connecting said push-pull amplifying circuit to receive said input signals and to supply amplified signals to said primary coil means of said output transformer so that said lesser gain and the threshold effect of the coercivity of said core prevent the production of output signals from said output transformer in response to the appearance of noise signals of said other polarity at said input means, and the substantially saturated state of said core at remanence prevents the production of output signals in response to the appearance of noise signals of said one polarity at said input means.

7. A noise insensitive timing pulse generator comprising a magnetic drum having spaced magnetized spots along a peripheral track, a magnetic head responsive to relative motion between said spots and said head to produce an alternating signal of a single cycle for each of said spots, pulse shaping means for producing timing pulses from said signals and suppressing intervening noise signals, said pulse shaping means including an input transformer having a core, one primary winding coupled to said head and first and second secondary windings, first and second transistors each having an emitter, collector and base electrode, the emitter base circuits of said first and second transistor being connected respectively across said first and second secondary windings, an output transformer having a core with a substantially rectangular hysteresis characteristic, first and second primary windings and a secondary winding, said first and second primary windings being respectively connected to the collector electrodes of said first and second transistors, and a resistor connected in series circuit with said first primary winding and said collector electrode of said first transistor whereby the energization of said first primary winding tends to be less than that of said second priary winding for similar signals received by the respective transistors, the circuit of said first secondary winding, first transistor and first primary winding being arranged to be responsive to one polarity of said alternating signal to cause the core of said output transformer to traverse its hysteresis loop from one remanent state to the opposite remanent state, and the circuit of said second secondary winding, second transistor and second primary winding being arranged to be responsive to another polarity of said alternating signal to cause the core of said output transformer to traverse its hysteresis loop from said opposite remanent state to said one remanent state so that said alternaing signal causes the core of said output transformer to completely traverse its hysteresis loop and said resistor prevents the response of the circuit of said first secondary winding, first transistors and first primary winding to noise signals of said one polarity from exceeding the coercivity of the core of said output transformer to minimize output in the secondary of said output transformer due to noise signals.

8. An electronic circuit comprising an input transformer having a core, one primary winding for receiving input signals and first and second secondary windings, first and second transistors each having an emitter, collector and base electrodes, the emitter-base circuits of said first and second transistors being respectively connected across said first and second secondary windings, an output transformer having a core with a substantially rectangular hysteresis characteristic, first and second primary windings, and an output secondary winding, said first and second primary windings being respectively connected to the collector electrode of said first and second transistors, and a resistor connected in series circuit with said first primary winding and said collector electrode of said first transistor so that the energization of said first primary winding tends to be less than that of said second primary winding for similar signals received by the respective transistors, the circuit of said first secondary winding, first transistor, first primary winding and resistor being arranged to be responsive to one polarity of energization of said one primary winding to cause the core of said output transformer to slowly traverse its hysteresis loop from one remanent state to the opposite remanent state whereby no significant signal is produced by said output secondary, and the circuit of said second secondary winding, second transistor and second primary winding being arranged to be responsive to another polarity of energization of said one primary winding to cause the core of said output transformer to rapidly traverse its hysteresis loop from said opposite remanent state to said one remanent state to produce a significant signal in said output secondary.

9. A timing pulse generator comprising a magnetic surface having spaced magnetized spots, a magnetic head responsive to relative motion between said spots and said head to produce for each spot an input signal having a single cycle comprised of a first polarity signal followed by a second polarity signal, pulse shaping means for producing timing pulses from said input signals and suppressing noise signals produced by spurious magnetization in areas of said surface between said spots, pulse shaping means including a first and second amplifier coupled to said head so as to be responsive to first and second polarities of said input signal respectively, an output transformer having a core with a rectangular hysteresis characteristic and exhibiting positive and negative values of coercivity, said first and second amplifiers being responsive respectively to said first and second polarities of said input signals to drive said output transformer from a first remanent state to a second remanent state and back to said first remanent state during said single cycle, and gain reducing means in said first amplifier to decrease the magnitude of drive applied to said output transformer by said first amplifier in response to said input and noise signals of a first polarity, said first polarity noise signals being insufficient to drive said output transformer from said first remanent state beyond the corresponding value of coercivity and noise pulses of an opposite polarity tending to drive said transformer into saturation from said first remanent state, whereby outputs from said output transformer resulting from said noise signals are prevented.

10. A timing pulse generator comprising a magnetic drum having spaced magnetized spots along a peripheral track, a transducer responsive to relative motion between said spots and said transducer to produce a true signal of alternating polarity and of a certain amplitude and noise signals having amplitudes within a certain lower range, a magnetic core with a rectangular hysteresis characteristic providing substantial saturation in both a first and second remanent state, means for driving said core in a first and second direction beyond the coercivity of said core in response to respective first and second polarities of said true signals, said means for driving said core including means for attenuating the drive of said core in said first direction below the drive of said core in said second direction, and output means for producing a pulse in response to the drive of said core by said true signal in said second direction only from said second remanent state, said means for attenuating the driving of said core in said first direction being effective to reduce the driving of said core below the coercivity corresponding to said first remanent state in response to noise signals of said first polarity, said noise signals of said second polarity being effective to drive said core into saturation from said first remanent state so that significant flux changes in said core due to noise signals within said certain lower range and of either said first or said second polarity are avoided when said core is in said first remanent state.

11. An electrical circuit comprising a first and a second amplifying circuit, means for receiving an input to said amplifying circuits, an output transformer, means connecting said first and second amplifying circuits in driving connection with said output transformer, said output transformer having a core which is substantially saturated at remanence and which requires a magnetizing force beyond a certain minimum value to effect a substantial change in the flux in said core thereby establishing a minimum drive from said first and second amplifying circuits required to produce an output, said first amplifying circuit producing less drive of said output transformer than said second amplifying circuit in response to signals of the same magnitude, said minimum value magnetizing force and said circuit drives establishing a minimum input required by said first amplifying circuit to produce an output when said core is in a first remanent state which is greater than the minimum input required by said second amplifying circuit to produce an output when said core is in a second remanent state so that undesirable inputs having a magnitude below said minimum and occurring when said core is in said first remanent state are prevented from producing outputs.

12. An electrical circuit comprising a transformer, circuit means connected to receive input signals and to drive said transformer in opposite directions for input signals of opposite polarity, said transformer having a core which is substantially saturated at remanence and which must be driven by a magnetizing force beyond a certain minimum value to effect a change in the flux in said core, output means responsive to said change in flux, and means providing a lesser drive of said transformer in response to input signals of a certain magnitude and one polarity than in response to input signals of the same magnitude and another polarity, so that input signals of one polarity occurring when said core is in a first remanent state are attenuated to eliminate undesirable noise signals without affecting the magnetizing force applied to said core by input signals of an opposite polarity when said core is in a second remanent state.

13. A noise suppressor circuit comprising a first and a second amplifying element, a transformer having a core with a substantially rectangular hysteresis characteristic, said transformer having a first and second primary winding and a secondary winding each linking said core whereby the current in said first and second primary windings must reach a threshold value before said secondary is substantially energized, input signal receiving means, circuit means connecting said first and second primary windings and said input signal receiving means in push-pull circuit connection with said first and second amplifying elements, and means included in circuit with said first amplifying element to reduce the gain due to said first amplifying element below that due to said second amplifying element so that noise signals of one polarity are suppressed to a value below said threshold value.

14. A noise suppressor circuit as recited in claim 13 wherein said first and second amplifying elements comprise transistors.

15. A noise suppressor circuit as recited in claim 13 wherein said means included in circuit with said first amplifying element to reduce the gain due to said first amplifying element comprises a resistor.

16. A pulse forming circuit for producing from an alternating current input signal a unidirectional pulse in substantially fixed time relation to the time at which the polarity of said alternating current signal changes in a certain direction and for suppressing noise signals, comprising two amplifying circuits connected in push-pull, one amplifying circuit having a gain less than the other of said amplifying circuits, bistable output means connected to said amplifying circuits and having for each stable state a threshold which must be exceeded by the outputs of each of said amplifying circuits to transfer said output means from one stable state to another, said amplifying circuit having less gain being operative to just overcome said threshold and change the state of said output means only at a relatively slow rate in response to one portion of said input signal, and the other of said amplifying circuits being operative to overcome said threshold sufficiently to produce a relatively rapid rate of change in the state of said output means, in response to another portion of said input signal, and means responsive to the rate at which said output means changes state to thereby produce a pulse in response to said other portions of said input signal significantly greater in magnitude than the pulse produced in response to said one portion of said input signal.

References Cited in the file of this patent

UNITED STATES PATENTS

| | | |
|---|---|---|
| 2,771,595 | Hendrickson et al. | Nov. 20, 1956 |
| 2,783,384 | Bright et al. | Feb. 26, 1957 |
| 2,797,401 | Green et al. | June 25, 1957 |
| 2,804,605 | De Turk | Aug. 27, 1957 |
| 2,855,146 | Henning et al. | Oct. 7, 1958 |
| 2,927,304 | Pacquin | Mar. 1, 1960 |